United States Patent
Chernoff et al.

(10) Patent No.: US 7,111,900 B2
(45) Date of Patent: Sep. 26, 2006

(54) VEHICLE FLOOR HAVING A UNITARY INNER PANEL AND OUTER PANEL

(75) Inventors: Adrian B. Chernoff, Royal Oak, MI (US); Christopher E. Borroni-Bird, Oakland Township, MI (US); Mohsen D. Shabana, Ann Arbor, MI (US); Robert Louis Vitale, Macomb Township, MI (US); Tommy E. White, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/763,564

(22) Filed: Jan. 23, 2004

(65) Prior Publication Data
US 2005/0161981 A1 Jul. 28, 2005

(51) Int. Cl.
*B60R 27/00* (2006.01)
(52) U.S. Cl. .................. 296/193.07; 296/204; 296/208
(58) Field of Classification Search ........... 296/193.07, 296/204, 208
See application file for complete search history.

(56) References Cited

U.S. PATENT DOCUMENTS

| | | | |
|---|---|---|---|
| 1,733,759 A | 10/1929 | Snell | |
| 2,696,774 A | 12/1954 | Bayley | 98/2 |
| 3,455,595 A | 7/1969 | Wessells et al. | 296/28 |
| 4,440,434 A | 4/1984 | Celli | 296/185 |
| 4,495,240 A * | 1/1985 | McCarthy | 428/319.1 |
| 5,351,990 A * | 10/1994 | Thomas | 280/789 |
| 5,449,321 A | 9/1995 | Dauvergne | 454/139 |
| 5,938,272 A | 8/1999 | Jerica et al. | 296/183 |
| 5,974,847 A | 11/1999 | Saunders et al. | 72/57 |
| 6,128,815 A | 10/2000 | Jurica et al. | 29/417 |
| 6,152,522 A | 11/2000 | Boulay et al. | 296/208 |
| 6,253,588 B1 | 7/2001 | Rashid et al. | 72/57 |
| 6,270,150 B1 * | 8/2001 | Miller et al. | 296/184.1 |
| 6,318,796 B1 | 11/2001 | Felsen | 296/208 |
| 6,504,093 B1 * | 1/2003 | Cawley | 174/48 |
| 6,537,641 B1 * | 3/2003 | Kroll | 428/95 |
| 6,547,301 B1 * | 4/2003 | Keller | 296/39.3 |
| 6,845,839 B1 * | 1/2005 | Chernoff et al. | 180/291 |
| 2002/0027368 A1 * | 3/2002 | Volz et al. | 296/66 |
| 2004/0104602 A1 * | 6/2004 | Cardimen et al. | 296/204 |

* cited by examiner

*Primary Examiner*—Lori L. Coletta
(74) *Attorney, Agent, or Firm*—Kathryn A. Marra

(57) ABSTRACT

A vehicle floor includes a unitary, one-piece panel. The panel is formed with an integral channel for routing a vehicle distribution system conduit therewithin. The panel may include an inner panel portion, an outer panel portion, integral rocker panel portions, front, rear and trunk floor portions. A method is provided for manufacturing a vehicle floor, the method including forming such a panel.

12 Claims, 5 Drawing Sheets

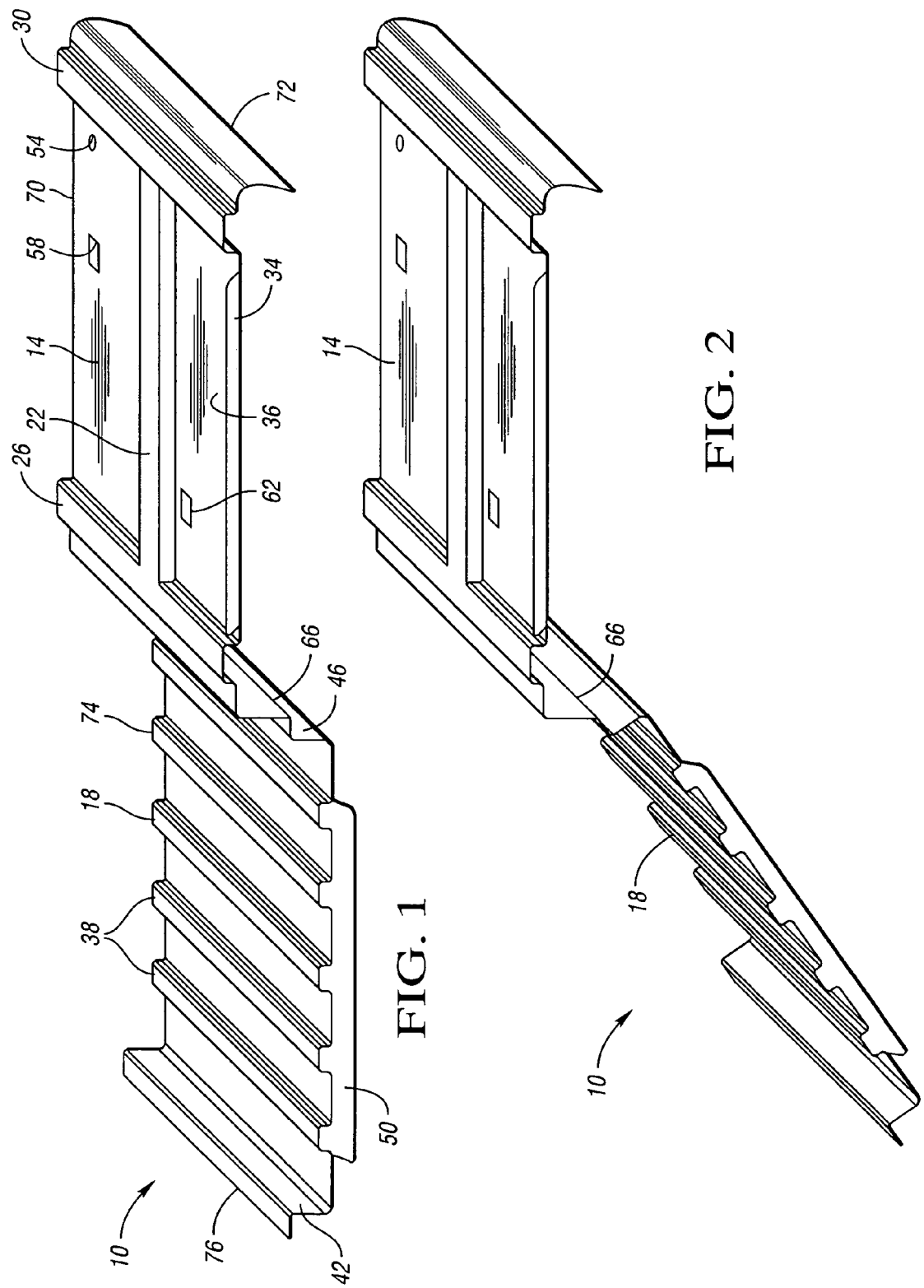

VEHICLE FLOOR HAVING A UNITARY INNER PANEL AND OUTER PANEL

TECHNICAL FIELD

This invention relates to vehicle floors characterized by a unitary, one-piece panel that forms an inner panel and an outer panel.

BACKGROUND OF THE INVENTION

A vehicle floor typically includes a multitude of separately formed panels including a left front floor panel, a right front floor panel, a tunnel panel and a rear floor panel. Additional reinforcement panels may also be necessary for sufficient rigidity. Underframe members including inner and outer rocker panels, a middle cross member, rear side frames and a rear cross member are necessary to provide structural support to the floor panels. The floor panels are welded or otherwise connected to each other and to underframe members to provide requisite rigidity and strength to the vehicle. Accordingly, many separate forming processes and connective steps are undertaken to form the floor and to connect it to the underframe.

Electrical wiring harnesses are typically routed alongside of rocker panels to desired locations such as vehicle seats, interior floor lights and trunk lights. Wires are typically laid across the vehicle floor when routed inboard from the rocker panels. Carpet is then laid over the wiring.

SUMMARY OF THE INVENTION

A vehicle floor is provided that includes a unitary, one-piece panel formed with an integral channel for routing a vehicle distribution system conduit at least partially within the channel. The vehicle distribution system may be an electrical, hydraulic or ventilation system. Preferably, the panel includes an inner panel portion and an outer panel portion and is sufficiently bendable between the inner and outer panel portions to at least partially enclose and further define the channel therebetween. The vehicle conduit may be routed within the channel either prior to or after bending the panel. Additionally, the panel may be formed to define integral, opposing rocker panel portions, and may include a front floor pan portion, a rear floor pan portion and a trunk portion.

The vehicle floor has fewer tolerance stack-ups, enabling better dimensional control as the multitude of parts discussed above are formed from a single piece of material. This consolidation of parts may result in increased rigidity as connections between parts are eliminated. Electrical wiring assembly may be simpler and more efficient as wires can be routed more directly to their destination points via the floor channel, by-passing more circuitous routes along the rocker panel.

A method is provided for manufacturing a vehicle floor. The method includes forming a unitary, one-piece panel with an integral channel for routing a vehicle distribution system conduit at least partially within the channel. The vehicle distribution system conduit is an electrical, hydraulic or ventilation system conduit. The unitary, one-piece panel has a first portion formed as an inner panel portion and a second portion formed as an outer panel portion. The panel is formed by quick plastic forming, superplastic forming or sheet hydroforming.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 1 is a perspective schematic view of a unitary, one-piece panel for a vehicle floor having an inner panel portion and a outer panel portion in a progressive first configuration;

FIG. 2 is a perspective schematic view of the panel of FIG. 1 in a progressive intermediate configuration in which the panel is partially bent along a fold line;

DESCRIPTION OF THE PREFERRED EMBODIMENTS

Figure 3:
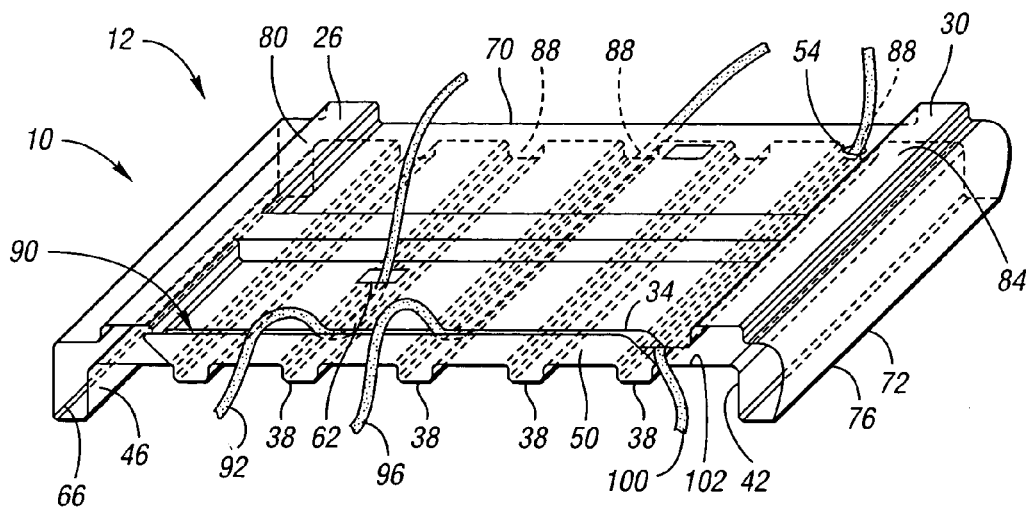
FIG. 3 is a perspective schematic view of the vehicle floor including the panel of FIGS. 1 and 2 in a progressive final configuration.

Referring to the drawings, wherein like reference numbers refer to like components, FIG. 1 shows a one-piece panel 10 including an inner panel portion 14 and an outer panel portion 18. The inner panel portion 14 is formed with an integral cross member 22 for lending rigidity to the one-piece panel 10. The inner panel portion 14 is further formed with a first upper rocker panel portion 26 and a second upper rocker panel portion 30. The inner panel portion 14 is also formed with an integral upward-turned flange 34. The outer panel portion 18 is formed with a multitude of longitudinal corrugated portions, also referred to as channels or corrugations 38. Corrugations may alternatively be formed cross-wise in the outer panel portion 18, at an angle or in a winding, serpentine manner, if desirable for the purposes discussed herein. The outer panel portion 18 is further formed with a first lower rocker panel portion 42 and a second lower rocker panel portion 46. The outer panel portion 18 further includes a downward-turned flange 50.

The inner panel portion 14 is also formed with and characterized by a broad flat portion 36. A substantially broad flat portion in the vehicle interior may be desirable from an aesthetic viewpoint. Typically, vehicle floors may not include such a flat portion because corrugations or similar strengthening formations are necessary to create requisite floor strength. The one-piece panel 10 enables the corrugations 38 in the outer panel portion 18 to be "hidden" beneath the inner panel portion 14 in formed floor 12 (shown in FIG. 3) allowing for the flat portion 36 to be exposed. Referring to FIG. 1, the cross member 22 may alternatively be formed in the outer panel portion 18, disposed across the corrugation 38. This would enable an even larger flat portion to be included in the inner panel portion 14, creating an even flatter appearance.

Vehicle distribution system conduit openings including an electrical distribution system opening 54, a ventilation system distribution opening 58 and a hydraulic distribution system opening 62 are cut, punched or otherwise made in the inner panel portion 14 (see FIG. 1).

A junction 66 of the first upper rocker panel portion 26 and the second lower rocker panel portion 46 runs across the panel 10 from front to back between the inner panel portion 14 and the outer panel portion 18. The junction 66 serves as, and may be referred to as, a fold line. Prior to bending (described with respect to FIG. 3) the fold line 66 may be a partially rounded corner of the formed panel 10. The inner panel portion 14 includes an inner panel portion periphery 70. A first segment 72 of the inner panel portion periphery 70 runs along an edge of the second upper rocker panel portion 30. Likewise, the outer panel portion 18 is characterized by a outer panel portion periphery 74 including a second segment 76 of the outer panel portion periphery 74 which runs along an edge of the first lower rocker panel portion 42.

Those skilled in the art will recognize a variety of materials that may be employed to form the panel 10, including various metals and plastics. Those skilled in the art will also recognize a variety of forming techniques that may be employed within the scope of the claimed invention to form the panel 10, such as, but not limited to, stamping, injection molding, etc. However, quick plastic forming, superplastic forming, or sheet hydroforming is preferably employed to form the panel 10 as a more complex shape than is generally obtainable with stamping may be achieved. Holes, apertures, and openings (such as openings 54, 58 and 62 discussed above) are cut, punched, or otherwise made after the panel 10 is formed.

Superplastic forming (SPF) is described in U.S. Pat. No. 5,974,847, issued Nov. 2, 1999 to Saunders, et al, which is hereby incorporated by reference in its entirety. When certain alloy compositions of steel or aluminum are suitably processed (such as with a very fine grain microstructure), they exhibit superplastic behavior at certain elevated temperatures. When deformed at these temperatures, the ductility (or elongation before yield or failure) of these materials exceeds several hundred percent. Such high levels of ductility can enable fabrication of very complex structures in a single sheet of material. A panel 10 of the design discussed above can be fabricated in one piece using such techniques.

In addition to various steels and aluminum alloys, other structural materials such as zinc, brass, magnesium, titanium and their alloys have also been reported to exhibit superplastic behavior. Furthermore, certain polymers and reinforced polymer composites have the required ductility to make this panel 10. These materials and other metal matrix composites could also be used to make the panel 10 of this invention, if desired.

In an example of superplastic forming, a blank, i.e., a sheet, is tightly clamped at its edges between complementary surfaces of opposing die members. At least one of the die members has a cavity with a forming surface opposite one face of the sheet. The other die opposite the other face of the sheet forms a pressure chamber with the sheet as one wall to contain the working gas for the forming step. The dies and the sheet are heated to a suitable SPF condition for the alloy. For SPF aluminum alloys, this temperature is typically in the range of 400° C. to 550° C. Electric resistance heating elements are located in press platens or sometimes embedded in ceramic or metal pressure plates located between the die members and the platens. A suitable pressurized gas such as argon is gradually introduced into the die chamber on one side of the sheet, and the hot, relatively ductile sheet is stretched at a suitable rate until it is permanently reshaped against the forming surface of the opposite die. The rate of pressurization is controlled so the strain rates induced in the sheet being deformed are consistent with the required elongation for part forming. Suitable strain rates are usually 0.0001 to 0.01 $s^{-1}$. During the deformation of the sheet, gas is vented from the forming die chamber.

The '847 patent provides a method of stretch forming a ductile metal sheet into a complex shape involving significant deformation without excessive thinning of the sheet material and without tearing it. The method is particularly applicable to the stretch forming of superplastic alloys heated to a superplastic forming temperature. In the method, additional material from the initially flat sheet blank is pulled or drawn into the forming cavity for stretch forming. The additional material significantly reduces thinning and tearing in the formed part.

The method contributes to thickness uniformity in an SPF stretch-formed component by utilizing controlled draw-in of sheet metal to the forming chamber prior to application of gas pressure. In an illustrative practice, a preform, similar to a stationary male punch, is placed on the forming press platen opposite the die cavity. An aluminum blank, for example, is placed over the insert and heated to a suitable SPF temperature for the alloy. The die is then moved toward its closed position against the platen. In its closing motion, the die engages the edges of the aluminum sheet. The heated metal is pulled over and around the insert, and draw-in of blank material thus occurs. This results in a greater amount of metal in the die cavity prior to SPF blow forming. The quantity of additional metal can be managed by design of the size, shape and location of the preform on the platen or complementary die member. But the additional metal in the die cavity reduces the amount of strain required and, hence, the amount of thinning to form a desired geometry compared to conventional SPF.

Thus, by the judicious use of a suitable space-occupying metal preform on a die or platen member opposite the forming die, additional metal is easily drawn into the cavity during die closure without significantly increasing the complexity of the tooling. Care is taken in the design of the preform to avoid excessive wrinkling of the drawn-in metal and to maintain a tight gas seal at the periphery of the sheet upon full die closure. The uniformity in thickness of the stretch-formed part is improved. Mass of the formed part can be reduced because the designer does not need to resort to thicker blanks to assure part quality. And, except for the simple preform, there is no increase in the complexity of the SPF tooling.

Quick plastic forming (QPF) is described in U.S. Pat. No. 6,253,588, issued Jul. 3, 2001 to Rashid, et al, which is hereby incorporated by reference in its entirety. For quick plastic forming, a preferred alloy is Aluminum Alloy 5083 having a typical composition, by weight, of about 4% to 5% magnesium, 0.3 to 1% manganese, a maximum of 0.25% chromium, about 0.1% copper, up to about 0.3% iron, up to about 0.2% silicon, and the balance substantially all aluminum. Generally, the alloy is first hot and then cold rolled to a thickness from about one to about four millimeters.

In the AA5083 alloys, the microstructure is characterized by a principal phase of a solid solution of magnesium in aluminum with well-distributed, finely dispersed particles of intermetallic compounds containing the minor alloying constituents, such as $Al_6Mn$.

Using QPF, large AA5083-type aluminum-magnesium alloy sheet stock may be formed into a complex three-dimensional shape with high elongation regions, like an SPF-formed part, at much higher production rates than those achieved by SPF practices. The magnesium-containing, aluminum sheet is heated to a forming temperature in the range of about 400° C. to 510° C. (750° F. to 950° F.). The forming may often be conducted at a temperature of 460° C. or lower. The heated sheet is stretched against a forming tool and into conformance with the forming surface of the tool by air or gas pressure against the back surface of the sheet. The fluid pressure is preferably increased continuously or stepwise from 0 psi gage at initial pressurization to a final pressure of about 250 to 500 psi (gage pressure, i.e., above ambient pressure) or higher. During the first several seconds up to about, e.g., one minute of increasing pressure application, the sheet accommodates itself on the tool surface. After this initial period of pressurization to initiate stretching of the sheet, the pressure can then be increased at an even faster rate. Depending upon the size and complexity of the panel to be formed, such forming can normally be completed in a period of about two to twelve minutes, considerably faster than realized in superplastic forming. Thus, by working a suitably fine grained, aluminum alloy sheet at significantly lower temperatures and continuously increased, higher gas pressures than typical SPF practices, significantly faster and more practical forming (at least for the automobile industry) times are achieved.

Referring now to FIG. 2, the one-piece panel 10, formed by SPF, or QPF, as described above, or formed by a sheet hydroforming process known to those skilled in the art, is shown in an intermediate state being bent along fold line 66 such that the outer panel portion 18 moves in a counter clockwise direction towards the inner panel portion 14.

Referring to FIG. 3, the one-piece panel 10 is shown completely bent along the fold line 66 to form a vehicle floor 12. The first upper rocker panel portion 26 is adjacent to the second lower rocker panel portion 46 to form a first rocker panel portion 80. Similarly, the second upper rocker panel portion 30 is now adjacent to the first lower rocker panel portion 42 to form a second rocker panel portion 84. As may be viewed in FIG. 3, the first segment 72 of the inner panel portion periphery 70 now continuously abuts the second segment 76 of the outer panel portion periphery 74. The first and second segments 72, 76 may be welded to secure the integrity of the floor 12.

After bending of the panel 10, it may be seen that enclosed channels 88 are formed between the inner panel portion 14 and the outer panel portion 18 at the corrugations 38 of the outer panel portion 18. Thus, the channels or corrugations 38 are further defined as enclosed channels 88. After bending, the upward-turned flange 34 and the downward-turned flange 50 are generally parallel. Preferably, a gap 90 is present between the flanges 34, 50. The floor is formed to allow a hydraulic conduit 92, a ventilation conduit 96 and an electrical conduit 100 to be routed through the enclosed channels 88. The hydraulic conduit 92 is disposed through gap 90 between the flanges 34, 50 through an enclosed channel 88 and then up through the hydraulic distribution system opening 62. Similarly, the ventilation conduit 96 is disposed between the flanges 34, 50 through an enclosed channel 88 and extends behind the floor 12 to be connected to another ventilation system component (not shown). The electrical conduit 100 is shown routed through a rocker panel portion opening 102 through an enclosed channel 88 and up through the electrical distribution system opening 54. As will be discussed below with respect to FIG. 5B, conduits may also be routed through openings cut into the flanges. Thus, the corrugations 38 serve the dual purpose of partially defining the enclosed channels 88, which are used for routing the conduits 92, 96, 100, and for enhancing the rigidity of the floor 12.

Figure 4A:
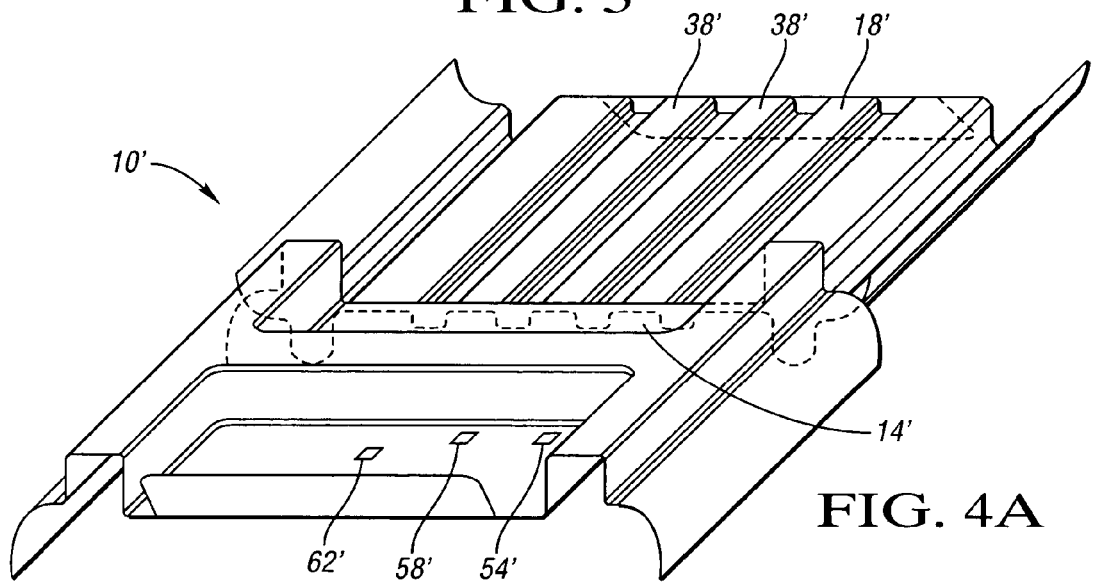
FIG. 4A is a perspective schematic view of another embodiment of a unitary, one-piece panel for a vehicle floor including an inner panel portion and a outer panel portion.
Figure 4B:
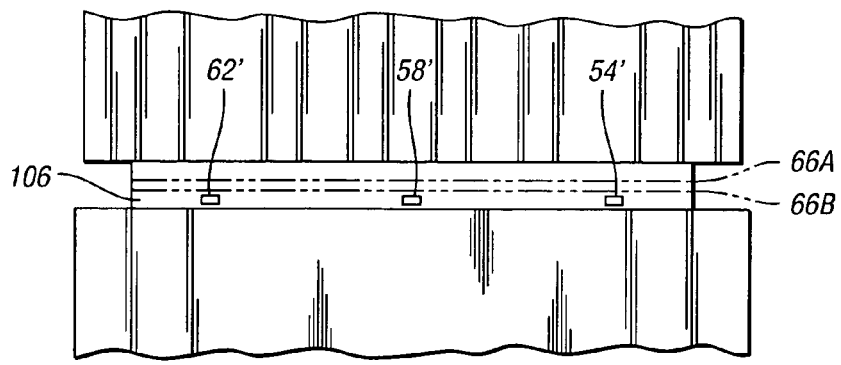
FIG. 4B is a fragmentary plan view of a joint portion between the inner panel portion and the outer panel portion of the panel of FIG. 4A.
Figure 4C:
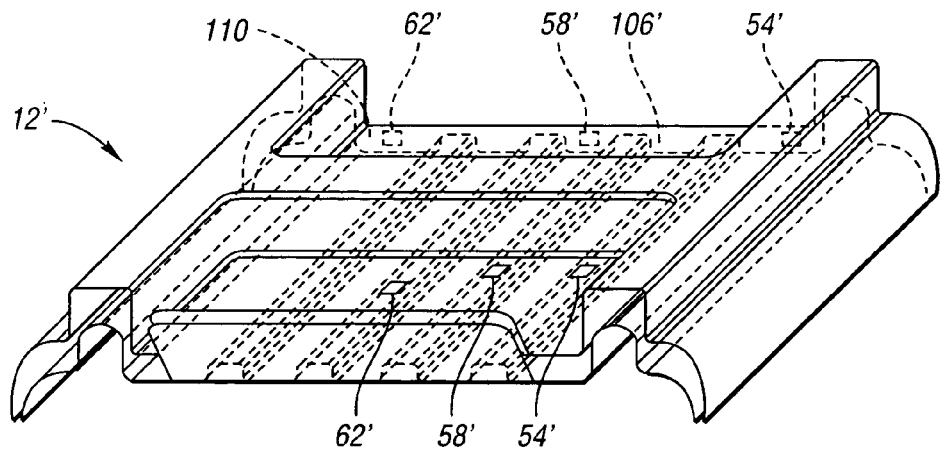
FIG. 4C is a perspective schematic view of the panel of FIG. 4A manufactured as a vehicle floor.

Referring to FIGS. 4A–4C, another embodiment of a one-piece panel 10' formed as a vehicle floor 12' (shown in FIG. 4C) is shown. The vehicle panel 10' includes an inner panel portion 14' and an outer panel portion 18'. The outer panel portion 18' is formed with corrugations 38'. As shown in FIG. 4B, the inner panel portion 14' and the outer panel portion 18' are separated by a joint portion 106. Preferably, a first fold line 66A and a second fold line 66B are disposed across the joint portion. As shown in FIG. 4C, the vehicle floor 12' is formed after bending the panel 10' at the first fold line 66A and, separately, at the second fold line 66B (both fold lines 66A and 66B are hidden from view in FIG. 4C). The floor 12' could also be formed with bending at only one fold line, but a configuration with two fold lines such as 66A and 66B permits a box-like configuration while allowing for sufficient depth to accommodate the enclosed channels 88' after bending. Referring to FIG. 4B, electrical distribution system openings 54', ventilation distribution system openings 58' and hydraulic distribution system openings 62' may be cut at the joint portion 106 and, as shown in FIG. 4A, in the inner panel portion 14'. Cutting of these openings 54', 58', 62' may occur after forming the one-piece panel 10'. After bending, as shown in FIG. 4C, the openings 54', 58', 62' cut in the joint portion 106 will be disposed at a back portion 110 of the vehicle floor 12' allowing hydraulic, ventilation and electrical conduits, to be routed through enclosed channels 88'. The conduits may be disposed out through the openings in the joint portion 106, if desired. Alternatively, the conduits may be disposed upward through the openings 54', 58', 62' in the inner panel portion 14'.

Figure 5B:
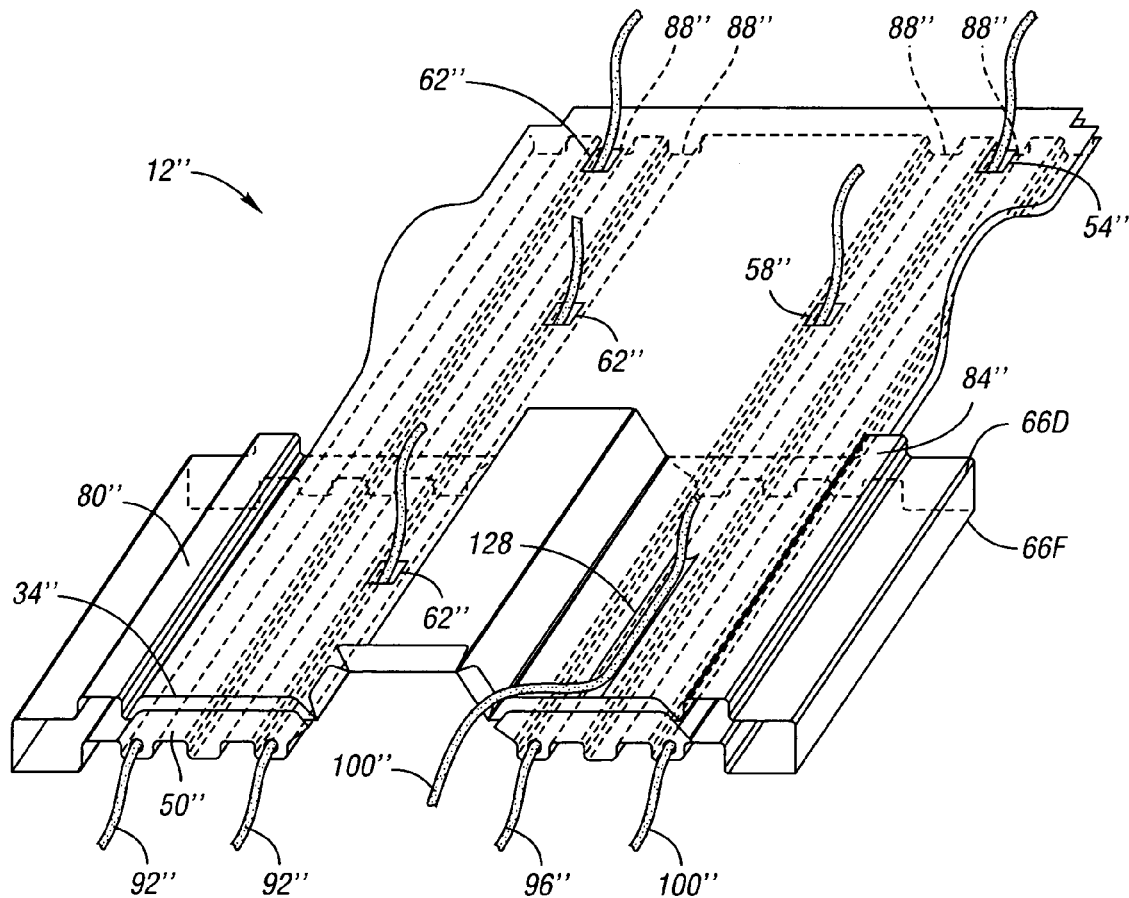
FIG. 5B is a perspective schematic view of the panel of FIG. 5A in a progressive final configuration in which the panel is bent along fold lines.
Figure 5A:
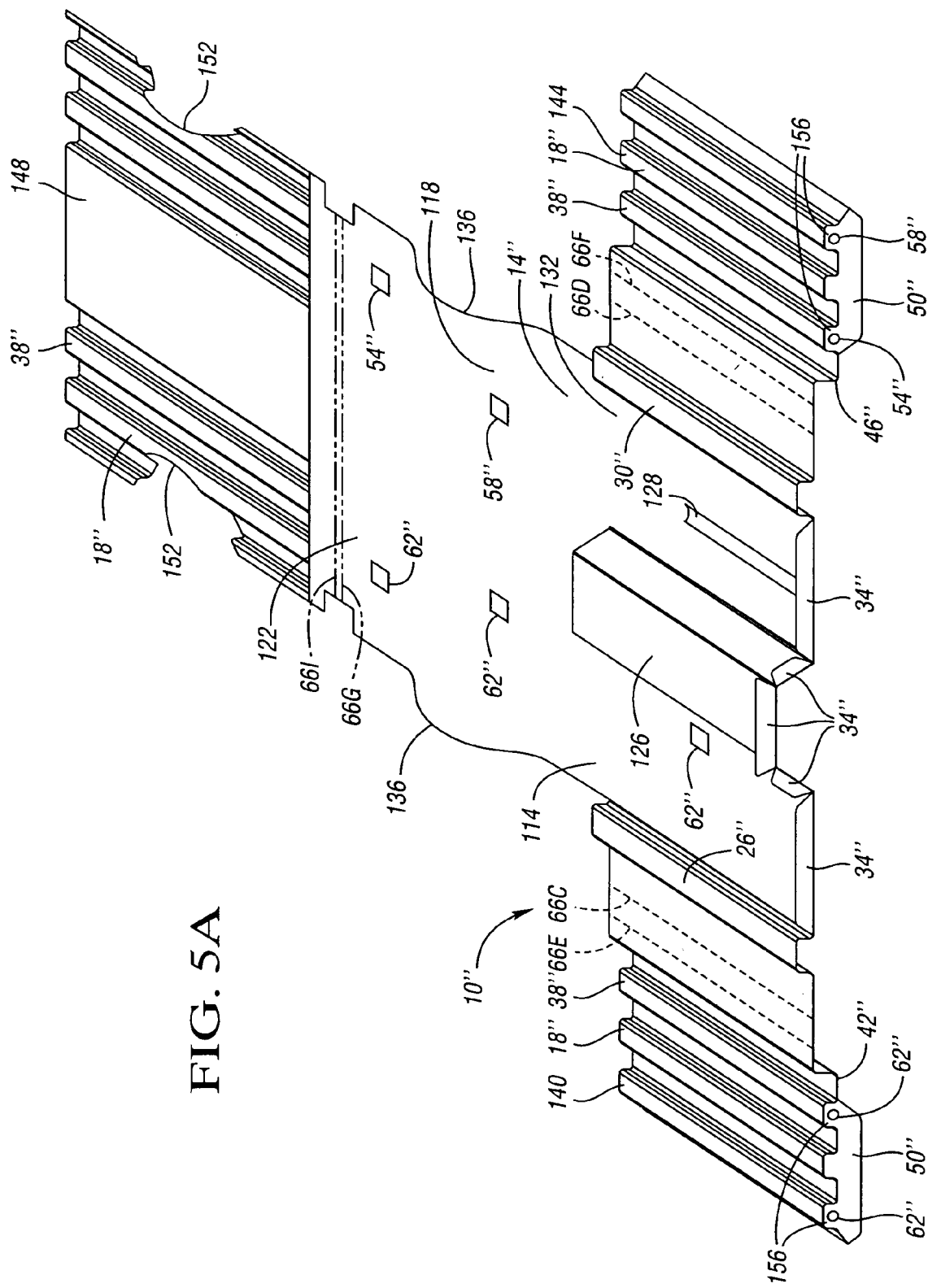
FIG. 5A is a perspective schematic view of yet another embodiment of a unitary, one-piece panel for a vehicle floor having an integral transmission tunnel in a progressive first configuration.

Referring to FIGS. 5A–5B, yet another embodiment of a one-piece panel 10" manufactured as a vehicle floor 12" (see FIG. 5B) is illustrated. The vehicle floor 12" includes an inner panel portion 14" having a front floor pan portion 114, a rear floor pan portion 118 and a trunk portion 122. The inner panel portion 14" includes an integral transmission tunnel 126. The inner panel portion 14" also includes a recessed channel 128 formed in an upper surface 132 of the inner panel portion 14". The inner panel portion is formed with wheel well formations 136. A variety of electrical distribution system openings 54", ventilation distribution system openings 58" and hydraulic distribution system openings 62" are formed in the upper surface 132 of the inner panel portion 14". Additionally, such openings 54", 58" and 62" are also formed in downward-turned flanges 50". The inner panel portion 14" further includes a first upper rocker panel portion 26" and a second upper rocker panel portion 30". Additionally, the inner panel portion 14" is formed with upward-turned flanges 34".

The outer panel portion 18" is composed of three separate portions, a left outer panel portion 140, a right outer panel portion 144 and a rear outer panel portion 148. Each of the left, right and rear outer panel portions 140, 144, 148 includes longitudinal corrugations 38". The left outer panel portion 140 includes a first lower rocker panel portion 42". Similarly, the right outer panel portion 144 includes a second lower rocker panel portion 46". The rear outer panel portion 148 is formed with wheel well cutouts 152. The outer panel portion 18" also includes downward-turned flanges 50". Electrical, ventilation and hydraulic distribution system openings 54", 58", 62", respectively, may be cut at ends 156 of the corrugations 38" adjacent to the downward-turned flanges 50".

The panel 10" includes six separate fold lines. First and second fold lines 66C and 66D are disposed on the inner panel portion between the first upper rocker panel portion 26" and the first lower rocker panel portion 42" and between the second upper rocker panel portion 30" and the second lower rocker panel portion 46", respectively. Third and fourth fold lines 66E, 66F are disposed adjacent to the first and second fold lines 66C, 66D, respectively. Fifth and sixth fold lines 66G, 66I are disposed between the trunk portion 122 and the rear outer panel portion 148.

Referring to FIG. 5B, the floor 12" formed from the panel 10" includes a first rocker panel portion 80" formed from first upper and first lower rocker panel portions 26", 42" (shown in FIG. 5A), respectively, and a second rocker panel portion 84" formed from second upper and lower rocker panel portions 30", 46" (shown in FIG. 5A), respectively. Two of the fold lines 66D, 66F are shown in FIG. 5B forming part of the second rocker panel portion 84". As may be viewed in FIG. 5B, after bending at the fold lines, the upward-turned flanges 34" are disposed adjacent to the downward-turned flanges 50". Flanges at the transmission tunnel 126 are not shown with mated downward-turned flanges 50" as the left and right outer panel portions 140, 144 do not extend inward as far as the transmission tunnel 126 after bending. Enclosed channels 88" disposed between the inner panel portion 14" and the outer panel portion 18" at corrugations 38" (shown in FIG. 5A) may be used for routing hydraulic, ventilation and electrical conduits 92", 96", 100", respectively. The conduits 92", 96" and 100" are routed through the openings 62", 58" and 54" in the downward-turned flanges 50" (shown in FIG. 5A), respectively. Within the scope of the claimed invention, the conduits need only be routed partially within the enclosed channels 88". For example, the ventilation conduit 96" may extend only partway into the channel 88", ending just beyond the opening 58" formed in the downward-turned flange 50" (shown in FIG. 5A), allowing forced air to be directed through the enclosed channel 88" such that at least some of the air exits at the opening 58" formed in the rear floor pan portion 118 (shown in FIG. 1A).

An electrical conduit 100" is shown routed in the recessed channel 128. Accordingly, channels within the scope of the invention include those enclosed between an inner panel portion 14" and an outer panel portion 18" as well as those formed on a surface of the panel 10" but not necessarily enclosed by the panel, such as recessed channel 128. A recessed channel may also be formed at a lower surface of the panel 10. Alternatively, a channel may be formed in the upper surface 132 of the inner panel portion 14" by creating elevated portions (not shown) in the upper surface 132 of the inner panel portion 14" disposed adjacent to one another to form a channel therebetween.

Figures 6, 7:
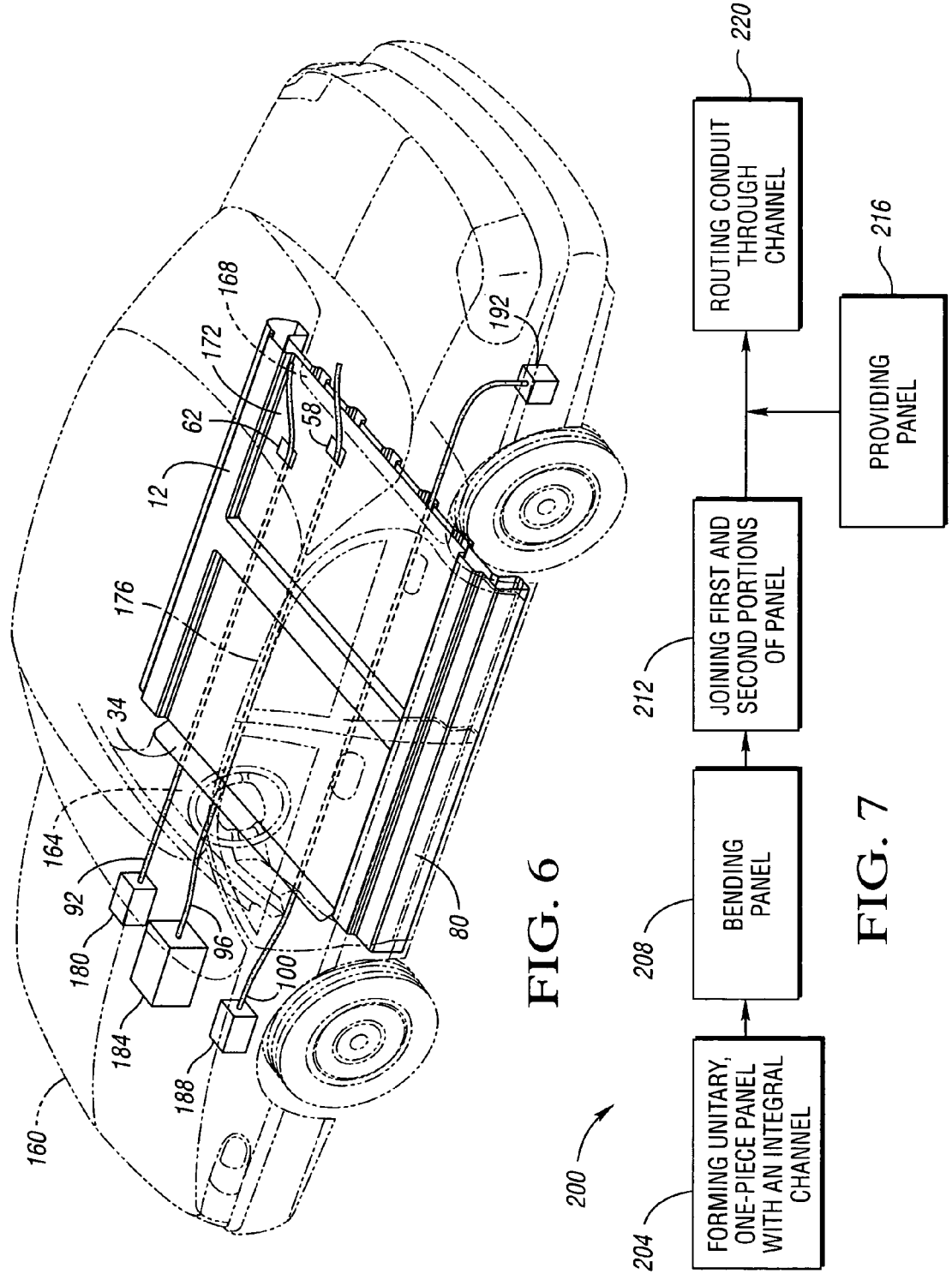
FIG. 6 is a perspective schematic view of the vehicle floor of FIG. 3 on a vehicle.
FIG. 7 is a flow diagram illustrating a method of manufacturing a vehicle floor formed from a unitary, one-piece panel.

Referring to FIG. 6, the vehicle floor 12 of FIG. 3 is shown connected to a vehicle 160. The upward-turned flange 34 and the downward-turned flange 50 (not shown) are joined to a front wall surface 164 of the vehicle 160. A rear wall surface 168 of the vehicle 160 is joined to a rear portion 172 of the floor 12. The vehicle door 176 is shown mated with the first rocker panel portion 80. The hydraulic conduit 92, ventilation conduit 96 and the electrical conduit 100 route from a hydraulic system component 180, a ventilation system component 184 and an electrical system component 188, respectively, through the enclosed channels 88 (not shown in FIG. 6 but viewable in FIG. 3) formed in the floor 12. The hydraulic conduit 92 extends upward through the hydraulic distribution system opening 62 to be connected to a second hydraulic system component (not shown). Likewise, the ventilation conduit 96 extends upward through the ventilation distribution system opening 58. The ventilation conduit 96 may alternatively end at the opening 58 to communicate, for example, heated or cooled air to the opening 58. The electrical conduit 100 extends through an enclosed channel 88 (shown in FIG. 3) to a second electrical system component 192 disposed at the rear of the vehicle. Accordingly, the enclosed channels 88 shown in FIG. 3 may be used for routing of a variety of vehicle distribution system conduits.

Referring to FIG. 7, a method of manufacturing a vehicle floor 200 is depicted. The method includes forming a unitary, one-piece panel 204 with an integral channel for routing a vehicle distribution system conduit at least partially within said channel, wherein the vehicle distribution conduit is selected from the group consisting of electrical, hydraulic and ventilation. The unitary, one-piece panel has a first portion formed as an inner panel portion and a second portion formed as an outer panel portion. The method of forming 204 is quick plastic forming, as described in detail above, superplastic forming or sheet hydroforming. The method 200 further includes bending the panel at a fold line 208 between a first portion of the panel and a second portion of the panel. Bending the panel at such a location is described in detail above. The method 200 further includes joining the first and second portions of the panel 212. Joining 212 may be by welding, including laser welding and spot welding, bonding or other methods of welding known to those skilled in the art. As discussed with respect to FIG. 3, the welding occurs along the first segment 72 of the inner panel portion periphery 70 and the second segment 76 of the outer panel portion periphery 74. The method 200 may include providing the so-formed unitary, one-piece panel 216.

The method may further include routing a vehicle system conduit 220 with respect to an opening defined by at least one of the first portion and the second portion such that the vehicle distribution system conduit is at least partially located within the channel, which is enclosed between the first and second portions after bending. The method 200 need not necessarily be performed in the order shown in FIG. 7. For example, routing a vehicle system conduit 220 may be performed prior to joining 212 the first and second portions of the panel, if this contributes to ease of assembly.

As set forth in the claims, various features shown and described in accordance with the different embodiments of the invention illustrated may be combined.

While the best modes for carrying out the invention have been described in detail, those familiar with the art to which this invention relates will recognize various alternative designs and embodiments for practicing the invention within the scope of the appended claims.

What is claimed is:

1. A vehicle floor comprising:
   a unitary, one-piece floor panel formed with an integral channel for routing a vehicle distribution system conduit at least partially within said channel, wherein the vehicle distribution system is selected from the group consisting of electrical, hydraulic and ventilation; and
   wherein the floor panel includes an inner panel portion and an outer panel portion forming a floor pan portion, and wherein the panel is sufficiently bendable between the inner panel portion and the outer panel portion to at least partially enclose and further define the channel therebetween.

2. The vehicle floor of claim 1, wherein at least one of the inner panel portion and the outer panel portion includes an integral corrugated portion and wherein the corrugated portion at least partially defines the channel.

3. The vehicle floor of claim 1 wherein at least one of the inner panel portion and the outer panel portion is formed with an integral flange, wherein said flange is matable with an adjoining surface on the vehicle to at least partially join the panel to the adjoining surface.

4. The vehicle floor of claim 1, wherein at least one of the inner panel portion and the outer panel portion at least partially defines an opening for said routing of said vehicle distribution system conduit within said channel.

5. The vehicle floor of claim 1, wherein the inner panel portion is formed to at least partially define an integral cross member.

6. The vehicle floor of claim 1, wherein the inner panel portion includes a substantially flat portion.

7. The vehicle floor of claim 1, wherein the panel is formed to at least partially define integral, opposing rocker panel portions.

8. The vehicle floor of claim 1, wherein the panel is formed to at least partially define an integral transmission tunnel.

9. The vehicle floor of claim 1, wherein the panel is formed to at least partially define a front floor pan portion, a rear floor pan portion and a trunk portion.

10. The vehicle floor of claim 1, wherein the panel is formed by a method selected from the group consisting of quick plastic forming, superplastic forming and sheet hydroforming.

11. The vehicle floor of claim 1, wherein the panel is comprised of a non-metal material.

12. A vehicle floor comprising:
a unitary, one-piece panel formed with an integral channel for routing a vehicle distribution system conduit at least partially within said channel, wherein the vehicle distribution system is selected from the group consisting of electrical, hydraulic and ventilation;
wherein the panel includes an inner panel portion and an outer panel portion, and wherein the panel is sufficiently bendable between the inner panel portion and the outer panel portion to at least partially enclose and further define said channel therebetween;
wherein the panel includes a front floor pan portion, a rear floor pan portion and a trunk portion;
wherein the panel is formed to at least partially define opposing rocker panel portions; and
wherein the panel is fanned by quick plastic forming.

* * * * *